US005100532A

United States Patent [19]

Roling et al.

[11] Patent Number: 5,100,532
[45] Date of Patent: Mar. 31, 1992

[54] SELECTED HYDROXY-OXIMES AS IRON DEACTIVATORS

[75] Inventors: Paul V. Roling, Spring; John E. Martin, Conroe, both of Tex.

[73] Assignee: Betz Laboratories, Inc., Trevose, Pa.

[21] Appl. No.: 622,456

[22] Filed: Dec. 5, 1990

[51] Int. Cl.$^5$ .............................................. C10G 9/16
[52] U.S. Cl. ........................ 208/48 AA; 208/177; 208/251 R; 44/420
[58] Field of Search ................ 585/2, 3; 208/48 AA, 208/177, 251 R; 44/420

[56] References Cited

U.S. PATENT DOCUMENTS

| | | | |
|---|---|---|---|
| 2,249,602 | 7/1941 | Chenicek | 44/9 |
| 2,300,998 | 11/1942 | White et al. | 44/420 |
| 2,336,598 | 12/1943 | Downing et al. | 44/73 |
| 2,361,339 | 10/1944 | White et al. | 44/420 |
| 2,381,952 | 8/1945 | Gubelmann | 44/420 |
| 2,422,566 | 6/1947 | Proell | 44/420 |
| 3,668,111 | 6/1972 | Dvoracek et al. | 208/48 AA |
| 4,749,468 | 6/1988 | Roling et al. | 208/48 |
| 4,810,354 | 3/1989 | Roling et al. | 208/48 |
| 4,847,415 | 7/1989 | Roling et al. | 564/367 |
| 4,853,109 | 8/1989 | Reynolds | 208/252 |
| 4,883,580 | 11/1989 | Roling et al. | 208/48 AA |

Primary Examiner—Theodore Morris
Assistant Examiner—William C. Diemler
Attorney, Agent, or Firm—Alexander D. Ricci; Bruce E. Peacock

[57] ABSTRACT

2'-hydroxy-4' or 5'-alkylacetophenone oximes and 2-hydroxy-4 or 5-alkylbenzaldehyde oximes are used to deactivate iron species contained in hydrocarbon fluids. Left untreated, iron leads to decomposition of the hydrocarbon, resulting in the formation of gummy, polymer masses in the hydrocarbon liquid.

17 Claims, No Drawings

SELECTED HYDROXY-OXIMES AS IRON DEACTIVATORS

FIELD OF THE INVENTION

This invention relates to the use of 2-hydroxy-4 or 5-alkylbenzaldehyde oximes and 2'-hydroxy-4' or 5'-alkylacetophenone oximes to deactivate iron species in hydrocarbon fluids.

BACKGROUND OF THE INVENTION

In a hydrocarbon stream, saturated and unsaturated organic molecules, oxygen, peroxides, and metal compounds are found, albeit the latter three in trace quantities. Of these materials, peroxides can be the most unstable, decomposing at temperatures from below room temperature and above depending on the molecular structure of the peroxide (G. Scott, "Atmospheric Oxidation and Antioxidants", published by Elsevier Publishing Co., NY 1965).

Decomposition of peroxides will lead to formation of free radicals, which then can start a chain reaction resulting in polymerization of unsaturated organic molecules. Antioxidants can terminate free radicals that are already formed.

Metal compounds and, in particular, transition metal compounds such as copper can initiate free radical formation in three ways. First, they can lower the energy of activation required to decompose peroxides, thus leading to a more favorable path for free radical formation. Second, metal species can complex oxygen and catalyze the formation of peroxides. Last, metal compounds can react directly with organic molecules to yield free radicals.

The first row transition metal species manganese, iron, cobalt, nickel, and copper are found in trace quantities (0.01 to 100 ppm) in crude oils, in hydrocarbon streams that are being refined, and in refined products. C. J. Pedersen (Inc. Eng. Chem., 41, 924–928, 1949) showed that these transition metal species reduce the induction time for gasoline, an indication of free radical initiation. Copper compounds are more likely to initiate free radicals than the other first row transition elements under these conditions.

To counteract the free radical initiating tendencies of the transition metal species and, in particular, copper, so called metal deactivators are added to fluids. These materials are organic chelators that tie up the orbitals on the metal rendering the metal inactive. When metal species are deactivated, fewer free radicals are initiated and smaller amounts of antioxidants are needed to inhibit polymerization.

Not all chelators will function as metal deactivators. In fact, some chelators will act as metal activators. Pedersen showed that while copper is deactivated by many chelators, other transition metals are only deactivated by selected chelators. Moreover, chelators or compounds that may be effective in deactivating a particular metal species, for example, copper, may or may not function effectively to deactivate other metals.

Iron has proven to be a particularly troublesome metal species when contained in liquid hydrocarbons. Liquid hydrocarbon mediums, such as crude oils, crude fractions, such as naphtha, gasoline, kerosene, jet fuel, fuel oil, gas oil and vacuum residuals, often contain metal contaminants, such as iron, that upon processing of the medium, can catalyze undesirable decomposition of the medium or accumulate in the process residue. Accumulation of iron contaminants, like others, is undesirable in the product remaining after refinery, purification, or other processes and, accordingly, diminishes the value of such products.

Iron contamination problems are experienced in conjuction with other liquid hydrocarbons, including aromatic hydrocarbons (i.e., benzene, toluene, xylene), chlorinated hydrocarbons (such as ethylene dichloride), and olefinic and naphthenic process streams. All of the above petroleum feedstock and fractions and petrochemicals are referred to herein as "liquid hydrocarbonaceous mediums".

Iron in such liquid hydrocarbonaceous mediums may occur in a variety of forms. For example, it may be present as a naphthenate, porphyrin, or sulfide. In any case, it is troublesome. For example, residuals from iron-containing crudes are used, inter alia, to form graphite electrodes for industry. The value and useful life of these electrodes is diminished proportionately with the level of undesirable iron contamination.

Additionally, in many processes, iron-containing catalysts are used which may carry over with the product during purification. Iron catalyst contaminated product leads to deleterious effects. This is especially true when $FeCl_3$ used to catalyze ethylenedichloride (EDC) production "carries over" or persists with the product during purification procedures. Iron or ferric chloride at high concentrations (50–5,000 ppm) causes EDC reboiler fouling to accelerate. Iron contamination causes feedstock degradation forming excessive organic tar and other residues which deposit on heat transfer surfaces, i.e., reboilers. The fouling may reduce plant production capacity and requires extra energy (steam) to run the reboiler properly.

PRIOR ART

In U.S. Pat. No. 4,749,468 (Roling et al), Mannich reaction products (i.e., alkylphenol, polyamine, and aldehyde) are taught as being useful deactivators of first row transition metal species, such as manganese, iron, cobalt, nickel, and copper.

U.S. Pat. No. 2,236,598 (Downing et al) indicates that copper is deactivated in organic substances, such as gasoline, etc. by a host of ortho-hydroxy aromatic oxime compounds including: 2-hydroxy-benzaldoxime, 2-hydroxy-3,5-dibromo-benzaldoxime, 2-hydroxy-3-methoxy-benzaldoxime, 2,4-dihydroxy-benzaldoxime, 2-hydroxy-1-naphthaldoxime, 2-hydroxy-acetophenoxime, 2-hydroxy-5-methyl-acetophenoxime, 2-hydroxy-4-methyl-acetophenoxime, 2,4-dihydroxy-acetophenoxime, and 2-hydroxy-propiophenoxime and others.

Hydroxybenzal-aminophenol compounds are disclosed in U.S. Pat. No. 2,249,602 (Chenicek) in methods for treating gum-forming hydrocarbon distillates containing metal compounds.

Other patents which may be of interest to the invention include U.S. Pat. No. 4,853,109 (Reynolds); U.S. Pat. No. 4,810,354 (Roling et al) and U.S. Pat. No. 4,847,415 (Roling et al).

DESCRIPTION OF THE INVENTION

The present invention pertains to the use of 2'-hydroxy-4' or 5'-alkylacetophenone oxime and 2-hydroxy-4 or 5alkylbenzaldehyde oxime compounds to deactivate troublesome iron species in liquid hydrocarbonaceous mediums. Some of these particular compounds are generally disclosed in U.S. Pat. No.

2,336,598, aforenoted, as being effective in deactivating copper in a host of organic substances. However, as shall be shown in the ensuing examples and comparative examples, one cannot accurately predict that a known copper deactivator will effectively function to deactivate iron.

The 2'-hydroxy-4' or 5'-alkylacetophenone oxime and 2-hydroxy-4 or 5-alkylbenzaldehyde oxime compounds, useful to deactivate Fe in accordance with the invention, are represented by the structural formula

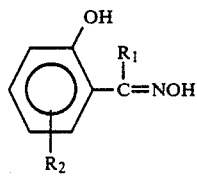

(I)

wherein $R_1$ is H or $C_1$–$C_{10}$ alkyl with $R_2$ comprising $C_1$–$C_{15}$ alkyl. $R_1$ is preferably either $CH_3$ or H. The $R_2$ grouping is preferably located at either the number 4 or number 5 position on the aromatic nucleus.

More specifically, location of $R_2$ is more preferred at the number 5 position, giving the structure

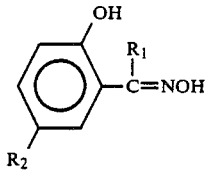

(II)

wherein $R_1$ and $R_2$ are as above-defined.

Exemplary oxime compounds include the following benzaldehyde oximes:
2-hydroxy-(4 or 5)-methylbenzaldehyde oxime
2-hydroxy-(4 or 5)-ethylbenzaldehyde oxime
2-hydroxy-(4 or 5)-propylbenzaldehyde oxime
2-hydroxy-(4 or 5)-butylbenzaldehyde oxime
2-hydroxy-(4 or 5)-amylbenzaldehyde oxime
2-hydroxy-(4 or 5)-hexylbenzaldehyde oxime
2-hydroxy-(4 or 5)-heptylbenzaldehyde oxime
2-hydroxy-(4 or 5)-octylbenzaldehyde oxime
2-hydroxy-(4 or 5)-nonylbenzaldehyde oxime
2-hydroxy-(4 or 5)-decylbenzaldehyde oxime
2-hydroxy-(4 or 5)-undecylbenzaldehyde oxime
2-hydroxy-(4 or 5)-dodecylbenzaldehyde oxime
2-hydroxy-(4 or 5)-tridecylbenzaldehyde oxime
2-hydroxy-(4 or 5)-tetradecylbenzaldehyde oxime
2-hydroxy-(4 or 5)-pentadecylbenzaldehyde oxime Acetophenone Oximes 2'-hydroxy-(4' or 5')-methylacetophenone oxime
2'-hydroxy-(4' or 5')-ethylacetophenone oxime
2'-hydroxy-(4' or 5')-propylacetophenone oxime
2'-hydroxy-(4' or 5')-butylacetophenone oxime
2'-hydroxy-(4' or 5')-amylacetophenone oxime
2'-hydroxy-(4' or 5')-hexylacetophenone oxime
2'-hydroxy-(4' or 5')-heptylacetophenone oxime
2'-hydroxy-(4' or 5')-octylacetophenone oxime
2'-hydroxy-(4' or 5')-nonylacetophenone oxime
2'-hydroxy-(4' or 5')-decylacetophenone oxime
2'-hydroxy-(4' or 5')-undecylacetophenone oxime
2'-hydroxy-(4' or 5')-dodecylacetophenone oxime
2'-hydroxy-(4' or 5')-tridecylacetophenone oxime
2'-hydroxy-(4' or 5')-tetradecylacetophenone oxime
2'-hydroxy-(4' or 5')-pentadecylacetophenone oxime Generally, the 2'-hydroxy-4' or 5'-alkyl acetophenone oxime and 2-hydroxy-4 or 5-alkyl benzaldehyde oxime compounds may be purchased from commercial suppliers, such as Aldrich. Additionally, the compounds may be prepared by the well known synthetic route of reacting hydroxylamine with the requisite ketone or aldehyde through the procedure

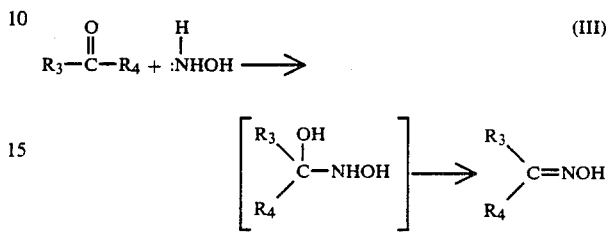

(III)

More specifically, and as shown in the examples, the compounds used as iron deactivators herein are prepared in a MeOH/$H_2O$ solution of $NH_2OH$ with the requisite 2-hydroxy-4 or 5-acetophenone or 2-hydroxy-4 or 5-benzaldehyde under reflux conditions. $R_3$ under scheme (III) is preferably H or $CH_3$ with $R_4$ equal to

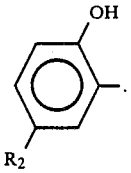

with $R_2$ defined as above.

The produced oximes wherein $R_2$ in formulae I or II is dodecyl are in the form of a viscous liquid which, for use in the iron deactivation process, are preferably diluted with inert organic solvent, such as xylene, hexane, heavy aromatic naphtha, diethyl ether, etc. The oximes of formulae I and II having $R_2$ groupings of about $C_{11}$ and less (i.e., fewer than eleven C atoms) are generally in the form of solids that, for use, are preferably dissolved in the above organic solvents.

The 2'-hydroxy-4' or 5'-alkyl acetophenone oximes and 2-hydroxy-4 or 5-alkyl benzaldehyde oximes are added to the desired liquid hydrocarbonaceous medium in need of iron deactivation. Ordinarily, in the absence of iron deactivation treatment, the iron species present would initiate formation of free radicals, leading to formation of gums, sediment, decomposition products and other fouling problems.

EXAMPLES

The invention will now be further described with reference to a number of specific examples which are to be regarded solely as illustrative and not as restricting the scope of the invention.

The ketone materials used as comparative examples were purchased. The following materials were also obtained from Henkel:
2'-hydroxy-5'-nonylacetophenone oxime
2-hydroxy-5-dodecylbenzaldehyde oxime
2'-hydroxy-acetophenone oxime All other materials used in the tests were synthesized in accord with the literature. (See Inorg. Chim. Acta III (1986) 187–192). Generally, the compounds were prepared in a solution of hydroxylamine. The hydroxylamine solution was prepared by dissolving 2.83 g (41 mmol) of hydroxylamine hydrochloride in 1.4 mL of methanol and 2.8 mL of water and adding to this solution 1.63 g (41 mmol) of sodium hydroxide dissolved in 1.4 ml of methanol and 2.8 ml of water. The hydroxylamine solution was then added over about 5 min. to a refluxing solution of 5.0 g of the variable reactant specified below in 8.5 mls of MeOH in order to produce the products listed below. The mixtures were refluxed for about 2 hours and then about 18.5 ml of water was added. The resulting mixture was cooled to room temperature. Solid crystal products were produced. The crystals were washed with water and dried.

| Variable Reactant | Product |
| --- | --- |
| 2'-hydroxyacetophenone | 2'-hydroxyacetophenone oxime (yield 4.71 g mp 115–116° C.) |
| 2'-hydroxy-5'-methoxyacetophenone | 2'-hydroxy-5'-methoxyacetophenone oxime (yield 4.92 g mp 112–113° C.) |
| 2'-hydroxy-5'-methylacetophenone | 2'-hydroxy-5'-methylacetophenone oxime (yield 5.25 mp 145–146° C.) |
| 2'-hydroxy-4'-methoxyacetophenone | 2'-hydroxy-4'-methoxyacetophenone oxime (yield 4.95 g mp 127–128° C.) |
| 2-hydroxy-5-nitrobenzaldehyde | 2-hydroxy-5-nitrobenzaldehyde oxime (yield 4.98 g mp 210–212° C.) |

EFFICACY

In order to assess the efficacy of the 2'-hydroxy-4'-and-5'-alkylacetophenone oxime and 2-hydroxy-4-and-5-alkylbenzaldehyde oxime compounds in iron deactivation and to contrast the field of iron deactivation and copper deactivation, peroxide tests were undertaken.

PEROXIDE TESTS

The peroxide test involves the reaction of a metal compound, hydrogen peroxide, a base, and a metal chelator. In the presence of a base, the metal species will react with the hydrogen peroxide yielding oxygen. When a metal chelator is added, the metal can be tied up resulting in the inhibition of the peroxide decomposition or the metal can be activated resulting in the acceleration of the rate of decomposition. The less oxygen generated in a given amount of time, the better the metal deactivator.

Tests were conducted using a 250-ml two-necked, round-bottomed flask equipped with an equilibrating funnel, a gas outlet tube and a magnetic stirrer. 10 ml of 3% (0.01 mol) hydrogen peroxide in water, 10 ml of a 0.01 M (0.0001 mol, 0.1 mmol) metal naphthenate in xylene solution and metal deactivator were added to the flask. A water-filled trap was added to the gas outlet tube of the flask. The stirrer was started and stirring kept at a constant rate to ensure good mixing of the water and organic phases. Ammonium hydroxide (25 ml of a 6% aqueous solution) was placed in the dropping funnel, the system closed, and the ammonium hydroxide added to the flask. As oxygen was evolved, water was displaced with the amount being recorded as a factor of time. A maximum oxygen evolution was 105 ml. The less oxygen evolved, the greater efficacy of the metal deactivator. With metal species absent, oxygen was not evolved over 10 minutes.

Tests results involving copper deactivation are show below in Table I.

TABLE I

Copper Deactivation
Milliliters of Oxygen Evolved in 5 Minutes
Copper Naphthenate at 0.010 M in Xylene

| Candidate Deactivator | mg Used | Approx. m mol | ml Oxygen Evolved |
| --- | --- | --- | --- |
| 2'-hydroxyacetophenone | 81 | 0.6 | 100(a), 100(a) |
| 2'-hydroxyacetophenone oxime | 90 | 0.7 | 4 |
| 2'-hydroxyacetophenone oxime | 100 | 0.7 | 2 |
| 2'-hydroxy-5'-methylacetophenone | 100 | 0.7 | 100(a) |
| 2'-hydroxy-5'-methylacetophenone oxime | 100 | 0.7 | 0 |
| 2'-hydroxy-5'-nonylacetophenone oxime | 50 | 0.2 | 100(b) |
| 2'-hydroxy-5'-nonylacetophenone oxime | 75 | 0.3 | 36 |
| 2'-hydroxy-5'-nonylacetophenone oxime | 100 | 0.4 | 0, 10 |
| 2'-hydroxy-5'-methoxyacetophenone | 100 | 0.6 | 100(a) |
| 2'-hydroxy-5'-methoxyacetophenone oxime | 100 | 0.6 | 4 |
| 2'-hydroxy-4'-methoxyacetophenone | 100 | 0.6 | 100(a) |
| 2'-hydroxy-4'-methoxyacetophenone oxime | 100 | 0.6 | 0 |
| 2-hydroxy-5-dodecylbenzaldehyde oxime | 50 | 0.2 | 100(a), 100(c) |
| 2-hydroxy-5-dodecylbenzaldehyde oxime | 75 | 0.2 | 47 |
| 2-hydroxy-5-dodecylbenzaldehyde oxime | 100 | 0.3 | 0, 0 |
| 2-hydroxy-5-dodecylbenzaldehyde oxime | 400 | 1.3 | 0 |
| 2-hydroxy-5-nitrobenzaldehyde | 100 | 0.6 | 100(a) |
| 2-hydroxy-5-nitrobenzaldehyde oxime | 100 | 0.6 | 1 |
| No additive | — | — | 100(a) |

(a) = 15–30 seconds instead of 5 minutes
(b) = 46 seconds instead of 5 minutes
(c) = 74 seconds instead of 5 minutes

DISCUSSION-TABLE 1

From the table, copper deactivation efficacy is shown for all of the oximes tested, especially at the 3:1 and greater oxime:copper(molar) ratios. The ketone and aldehydes were generally not effective. This is consistent with the disclosure of U.S. Pat. No. 2,336,598 (Downing et al) which teaches the use of various 2-hydroxyaromatic oxime compounds to deactivate copper in a host of organic mediums, such as cracked gasolines, petroleum lubricating oils, fruit juices, straight-run gasolines, etc. (see page 4, column 2, lines 52-page 5, column 1, line 11).

However, as is shown in the iron deactivation tests reported in Table II, skilled artisans cannot predict that a given compound will effectively deactivate troublesome iron species in liquid hydrocarbonaceous mediums based upon the known copper deactivation efficacy of a given compound.

TABLE II

Iron Deactivation
Milliliters of Oxygen Evolved in 5 Minutes
Iron Naphthenate at 0.010 M in Xylene

| Candidate Deactivator | mg Used | Approx. m mol | ml Oxygen Evolved |
| --- | --- | --- | --- |
| 2'-hydroxyacetophenone | 81 | 0.6 | 58, 50 |
| blank | — | | 63, 58 |
| 2'-hydroxyacetophenone oxime | 90 | 0.7 | 65 |
| blank | — | | 63 |
| 2'-hydroxyacetophenone oxime | 100 | 0.7 | 78 |
| blank | — | | 58 |
| 2'-hydroxy-5'-methylacetophenone | 100 | 0.7 | 53 |
| blank | — | | 58 |
| 2'-hydroxy-5'-methylacetophenone | 100 | 0.7 | 24 |

TABLE II-continued

Iron Deactivation
Milliliters of Oxygen Evolved in 5 Minutes
Iron Naphthenate at 0.010 M in Xylene

| Candidate Deactivator | mg Used | Approx. m mol | ml Oxygen Evolved |
|---|---|---|---|
| oxime | | | |
| blank | — | | 58 |
| 2'-hydroxy-5'-nonylacetophenone oxime | 75 | 0.3 | 7 |
| blank | — | | 56 |
| 2'-hydroxy-5'-nonylacetophenone oxime | 100 | 0.4 | 4 |
| blank | — | | 56 |
| 2'-hydroxy-5'-nonylacetophenone oxime | 100 | 0.4 | 4 |
| blank | — | | 42 |
| 2'-hydroxy-5'-nonylacetophenone oxime | 100 | 0.4 | 1 |
| blank | — | | 22 |
| 2'-hydroxy-5'-methoxyacetophenone | 100 | 0.6 | 57 |
| blank | — | | 58 |
| 2'-hydroxy-5'-methoxyacetophenone oxime | 100 | 0.6 | 98 |
| blank | — | | 58 |
| 2'-hydroxy-4'-methoxyacetophenone | 100 | 0.6 | 32, 43 |
| blank | — | | 58, 42 |
| 2'-hydroxy-4'-methoxyacetophenone oxime | 100 | 0.6 | 37 |
| blank | — | | 58, 42 |
| 2-hydroxy-5-dodecylbenzaldehyde oxime | 75 | 0.2 | 7 |
| blank | — | | 59 |
| 2-hydroxy-5-dodecylbenzaldehyde oxime | 100 | 0.3 | 5 |
| blank | — | | 59 |
| 2-hydroxy-5-dodecylbenzaldehyde oxime | 100 | 0.3 | 2 |
| blank | — | | 42 |
| 2-hydroxy-5-dodecylbenzaldehyde oxime | 400 | 1.3 | 0 |
| blank | — | | 22 |
| 2-hydroxy-5-nitrobenzaldehyde | 100 | 0.6 | 100(a) |
| blank | — | | 42 |
| 2-hydroxy-5-nitrobenzaldehyde oxime | 100 | 0.6 | 40 |
| blank | — | | 42 |

(a) = In 3.3 minutes instead of 5 minutes

DISCUSSION-TABLE II

Quite surprisingly, only the tested 2'-hydroxy-4' or 5'-alkylacetophenone oxime compounds and the 2-hydroxy-4 or 5-alkylbenzaldehyde oxime compounds effectively deactivated iron in the xylene medium. This is indeed surprising since the 2'-hydroxy-4' or 5'-alkoxyacetophenone oxime compounds were effective in the copper deactivation tests but not in the iron tests. In fact, 2'-hydroxy-5'-methoxyacetophenone oxime appears to activate oxygen production in the iron naphthenate-xylene test medium.

One particularly troublesome environment in which iron deactivation is needed is in the production and purification of ethylenedichloride (EDC). Commonly, in EDC production, $FeCl_3$ is used as a catalyst. Oftentimes, the catalyst carries over with the EDC product during purification, leading to product instability and deterioration. For unknown reasons, it is especially difficult to deactivate $FeCl_3$ in EDC solutions even for those candidate compounds that are generally effective in deactivating iron in other mediums (e.g., iron naphthenate in xylene solutions). Accordingly, even small improvements in performance are thought beneficial.

In order to assess the efficacy of the 2'-hydroxy-4' or 5'-alkylacetophenone oxime and 2-hydroxy-4 or 5-alkylbenzaldehyde oxime compounds in deactivating $FeCl_3$ in EDC solutions, peroxide tests, as noted above were performed. Results appear in Table III.

TABLE III

Iron(III) Chloride Deactivation in EDC
Milliliters of Oxygen Evolved in 5 Minutes
($FeCl_3$ at 0.010 M in EDC)

| Candidate Deactivator | mg Used | Approx. m mol | ml Oxygen Evolved |
|---|---|---|---|
| 2'-hydroxy-5'-nonylacetophenone oxime | 100 | .4 | 52 |
| 2'-hydroxy-5'-nonylacetophenone oxime | 400 | 1.4 | 40 |
| 2'-hydroxy-5'-dodecylbenzaldehyde oxime | 100 | .3 | 42 |
| blank | — | | 60, 61 |
| 2'-hydroxy-5'-nonylacetophenone oxime | 56 | .2 | 50 |
| 2'-hydroxy-5'-nonylacetophenone oxime | 112 | .4 | 57 |
| 2'-hydroxy-5'-nonylacetophenone oxime | 280 | 1.0 | 47 |
| blank | — | | 78, 70, 75, 70 |

In accordance with Table III, it can be seen that the 2'-hydroxy-4' or 5'-alkylacetophenone oxime and 2-hydroxy-4 or 5-alkylbenzaldehyde oximes are also effective in deactivating troublesome $FeCl_3$ species in EDC solutions.

Based upon preliminary data, it is preferred to use either 2'-hydroxy-5'-nonylacetophenone oxime or 2-hydroxy-5-dodecylbenzaldehyde oxime as the iron deactivator, added to the liquid hydrocarbonaceous medium in need of iron deactivation in an amount of about 1-6 moles deactivator:mole of iron. An even more preferred addition level is 3-6 moles of deactivator:mole iron.

The iron deactivators may be added during processing of the liquid hydrocarbonaceous medium at any time or they may be added prior to or during storage or transit of the finished product to inhibit gum and film formation. For example, in a refinery process, the iron deactivators could be added to the liquid hydrocarbonaceous medium, such as crude oil, downstream from conventional desalting operations. The iron deactivators may be added even during heat treatment processes (100°-1000° F.) which are used to form finished, refined, or purified liquid hydrocarbonaceous product.

Moreover, with respect to use in EDC processes, the iron deactivators can be added during EDC purification or they may be added to the purified EDC product prior to transport or storage thereof.

In accordance with the patent statutes, the best mode of practicing the invention has been set forth. However, it will be apparent to those skilled in the art that many other modifications can be made without departing from the invention herein disclosed and described, the scope of the invention being limited only by the scope of the attached claims and the equivalents thereof.

We claim:

1. A method of deactivating Fe metal species contained in a liquid hydrocarbonaceous medium, wherein in the absence of said deactivating, said iron species would promote fouling in said liquid hydrocarbonaceous medium, said method comprising adding to said medium from about 1-6 moles of a iron deactivator based upon one mole of iron contained in said medium of a compound having the structure

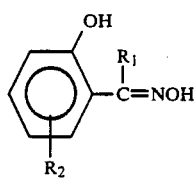

wherein $R_1$ is chosen from H and $C_1$–$C_{10}$ alkyl and $R_2$ is $C_1$–$C_{15}$ alkyl.

2. A method as recited in claim 1 wherein said liquid hydrocarbonaceous medium is a member selected from the group consisting of crude oil and crude oil fractions.

3. A method as recited in claim 2 wherein said crude oil fractions comprise naphtha, gasoline, kerosene, diesel fuel, jet fuel, fuel oil, gas oil and vacuum residiums.

4. A method as recited in claim 1 wherein said liquid hydrocarbonaceous medium comprises a petrochemical selected from olefinic process streams, naphthenic process streams, ethylene glycol, ethylene dichloride and aromatic hydrocarbons.

5. A method as recited in claim 1 further comprising heating said liquid hydrocarbonaceous medium to a temperature of about 100°–1000° F.

6. A method as recited in claim 1 comprising adding said iron deactivator to said medium in an amount of from about 3–6 moles of said deactivator based upon one mole of said iron.

7. A method as recited in claim 1 wherein $R_1$ is $CH_3$.

8. A method as recited in claim 7 wherein $R_2$ is methyl.

9. A method as recited in claim 7 wherein $R_2$ is nonyl.

10. A method as recited in claim 7 wherein $R_2$ is dodecyl.

11. A method as recited in claim 1 wherein $R_1$=H.

12. A method as recited in claim 11 wherein $R_2$=dodecyl.

13. A method as recited in claim 1 wherein said compound comprises the structure

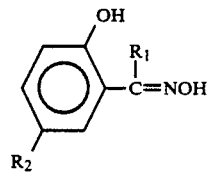

14. A method as recited in claim 13 wherein $R_1$ is H and $R_2$ is dodecyl.

15. A method as recited in claim 13 wherein $R_1$ is $CH_3$ and $R_2$ is methyl.

16. A method as recited in claim 13 wherein R1 is $CH_3$ and $R_2$ is nonyl.

17. A method as recited in claim 13 wherein $R_1$ is $CH_3$ and $R_2$ is dodecyl.

* * * * *

UNITED STATES PATENT AND TRADEMARK OFFICE
CERTIFICATE OF CORRECTION

PATENT NO. : 5,100,532
DATED : March 31, 1992
INVENTOR(S) : Paul V. Roling, et. al.

It is certified that error appears in the above-indentified patent and that said Letters Patent is hereby corrected as shown below:

On the Title page, item [75], inventor: should read -- Paul B. Roling, Spring; John F. Martin, Conroe, both of Texas --.

Signed and Sealed this

Twenty-eighth Day of June, 1994

Attest:

BRUCE LEHMAN

*Attesting Officer*     *Commissioner of Patents and Trademarks*